United States Patent [19]

Scherr et al.

[11] Patent Number: 4,529,858
[45] Date of Patent: Jul. 16, 1985

[54] MULTISPOT GRID-WELDING MACHINE

[75] Inventors: Rudolf Scherr; Gerhard Schmidt; Edgar Pollhammer; Gerhard Ritter; Klaus Ritter, all of Graz, Austria

[73] Assignee: EVG Entwicklungs- und Verwertungs-Gesellschaft m.b.H., Graz, Austria

[21] Appl. No.: 530,218

[22] Filed: Sep. 8, 1983

[30] Foreign Application Priority Data

Oct. 22, 1982 [AT] Austria ............................... 3889/82

[51] Int. Cl.³ ............................................. B23K 11/10
[52] U.S. Cl. ...................................... 219/56; 219/86.1; 219/87
[58] Field of Search ...................... 219/56, 86.1, 86.25, 219/87, 88, 58

[56] References Cited

U.S. PATENT DOCUMENTS

| 2,446,648 | 8/1948 | Glantzer | 219/56 X |
| 2,497,260 | 2/1950 | Griesemer | 219/56 |
| 3,663,789 | 5/1972 | Camardella | 219/56 X |

FOREIGN PATENT DOCUMENTS 325393 10/1975 Austria .
1176299 8/1964 Fed. Rep. of Germany .

Primary Examiner—Roy N. Envall, Jr.
Assistant Examiner—C. M. Sigda
Attorney, Agent, or Firm—Ernest F. Marmorek

[57] ABSTRACT

A multispot grid-welding machine has an electrode-carrier beam movable up and down and a plurality of guide rods mounting a plurality of electrode units for movement on the beam. Pressure springs bias the electrode units in a direction towards the grid being welded, each electrode unit being movable into a working position and a rest position in which it is retracted. A plurality of return springs act on the electrode units, the return springs being considerably weaker than the pressure springs and acting to shift the respective electrode units on the working position into the retracted position. Devices are provided for advancing selected electrode units into the working position by overcoming the force of the return springs.

4 Claims, 6 Drawing Figures

MULTISPOT GRID-WELDING MACHINE

BACKGROUND OF THE INVENTION

The invention relates to a multispot grid-welding machine having an electrode-carrier beam which can be moved up and down in welding tempo and on which by means of guide rods a plurality of electrode units are moved, loaded by pressure-springs, in the direction towards the grid welding plane, and in which each electrode unit can be located in a retracted position of rest.

In multispot grid-welding machines of this type, known from AT-A- 325,393, the guide rods by means of which the electrode units are guided displaceably on the electrode-carrier beam are provided with stops, which cooperate with locking pins. If the electrode-carrier beam is lying in its lowest position, in which the electrode pressure-springs are compressed to their greatest amount, the guide rods of selected electrodes can be raised a little by the application of force by hand, by further compressing the electrode pressure-springs, and the associated locking pins can then be advanced under the stops on these guide rods until, upon subsequent raising of the electrode-carrier beam, relief of the pressure-springs in question is prevented. The selected electrodes then remain locked in a raised position of rest relative to the electrode-carrier beam, and upon lowering the electrode-carrier beam once more cannot come into contact with the work which is to be welded.

In this way it is possible to exclude selected electrodes from the welding process, for example, when grids must be produced with pitches of the longitudinal wires which amount to an integral multiple of the smallest pitch of the longitudinal wires, i.e., a basic spacing.

In the known machine the resetting of the electrodes, namely from the basic spacing to a multiple thereof by locking the electrodes not needed in the raised position during welding at the wider spacing, is possible only while the machine is at a standstill and only by hand, and the electrode-carrier beam must furthermore be lying in its lowest position. The resetting process is time-consuming, because the machine operator proceeding along the electrode-carrier beam, must in succession snap the locking pins into their active positions on all of the electrodes, which are to be excluded. Actuation of the locking pins is hardly possible if there is a grid in the machine, because the machine operator in this case cannot reach over to those locking pins which lie along the electrode-carrier beam at a greater distance than an arm's length from the edge of the grid. Finally, before locking an electrode, its guide rod must be raised a little against the whole considerable biasing force of the associated pressure-spring, in order to be able to bring the locking pin into its active position.

The invention has as its object the development of a multispot grid-welding machine in which the electrode units (which may be formed by single electrodes for single-spot welding, or by pairs of electrodes for double-spot welding, together with their associated electrode holders) may, even during operation of the machine, be brought selectively out of, or into a working position, in which they take part in the welding process, and into or out of, respectively, a position of rest, in which they do not participate in the welding process, without any additional stressing of the very powerful electrode pressure-springs being necessary.

SUMMARY OF THE INVENTION

This problem is solved in a welding machine according to the invention by subjecting the electrode units to the action of return springs which are considerably weaker than the pressure-springs, and tend to shift the associated electrode units out of the advanced working position into the retracted position of rest lying nearer the electrode-carrier beam, means being provided for advancing selected electrode units into the working position by overcoming the force of the return springs.

BRIEF DESCRIPTION OF THE DRAWING

Further features of the invention follow from the description below with reference to the accompanying drawings in which.

DESCRIPTION OF THE PREFERRED EMBODIMENTS

Figure 1:
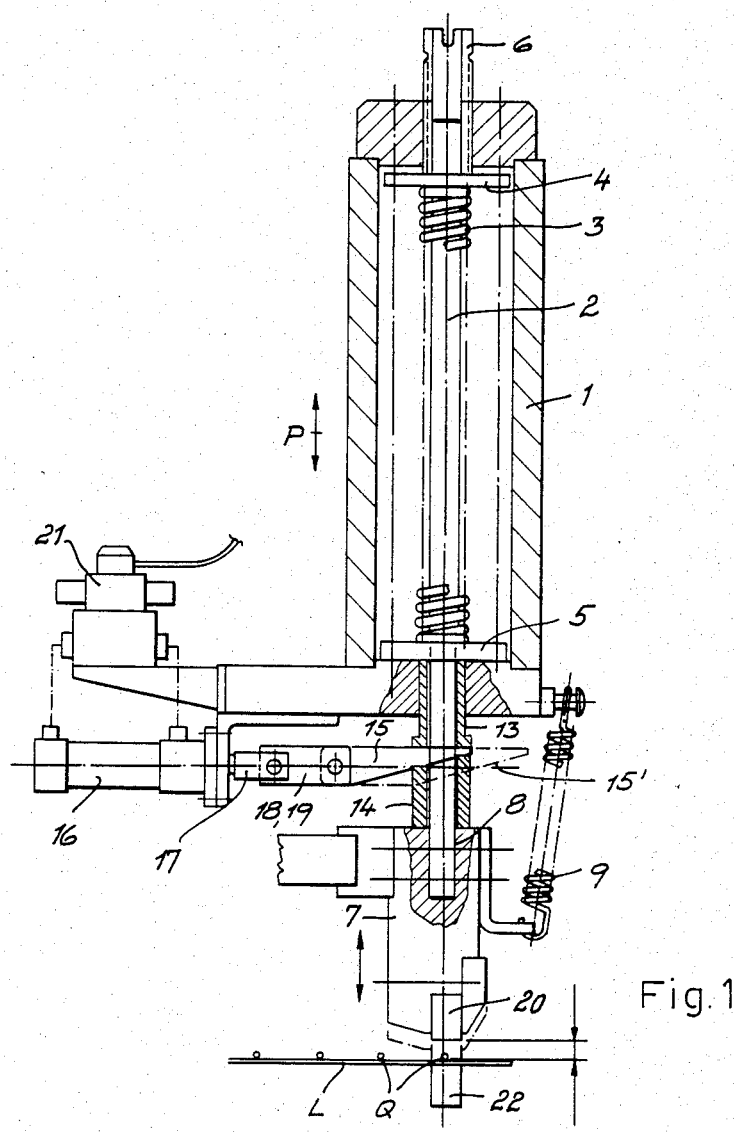
FIG. 1 shows in elevation the upper part containing the electrode-carrier beam, of a grid-welding machine in accordance with the invention.

An electrode-carrier beam 1 of a grid-welding machine, made in the form of a box girder as known, has, a plurality of guide rods 2 arranged in line along the beam. Each guide rod 2 is surrounded by a helical spring 3 which bears against an upper spring plate 4 and a lower spring plate 5. In the embodiment shown in FIGS. 1 and 2 the guide rod 2 is freely displaceable with respect to the two spring plates 4 and 5. A threaded sleeve 6 which can be screwed into the cover plate of the carrier beam 1 and surrounds coaxially the upper end of the guide rod 2, provides a means of adjusting vertically each upper spring plate 4 inside the carrier beam 1. It is thereby within limits possible to alter the pre-stress of the springs 3 which serve as pressure-springs for the welding electrodes.

The bottom end of each guide rod 2 is fixed in a hole 8 drilled in an electrode unit 7. A return spring 9 loads the electrode unit 7 in the direction towards the carrier beam 1. Between the electrode unit 7 and the spring plate 5 are two sleeves 13 and 14 which surround the guide rod 2 coaxially and can be displaced relative to one another and to the guide rod. The sleeve 13 has an upper annular face which bears against the spring plate 5, and the sleeve 14 has a lower annular face which bears against the electrode unit 7. Between the adjacent annular end faces on the sleeves 13 and 14 is a forked wedge 15 which surrounds the guide rod 2. Two connecting links 18, 19, connected by pivots to the wedge 15 and to the piston rod 17 of an operating cylinder 16, enable the wedge 15 to be shifted by the operating cylinder 16 between the position shown in FIG. 1 in solid line and the position shown in the same figure in dash-dot line. The position shown in FIG. 1 in solid line corresponds in FIG. 2 with the position of the parts provided with the reference numbers 15-19, whilst the position shown in FIG. 1 in dash-dot line corresponds in FIG. 2 with the position of the adjacent parts provided with the reference numbers 15'-19'.

By advancing the wedge 15 into the position similar to that which the wedge 15' occupies, the distance between the adjacent annular end faces on the sleeves 13 and 14 is increased, so that the electrode unit 7 is shifted out of its position of rest close to the carrier beam 1 into a working position further away from the carrier beam 1. The guide rod 2 connected rigidly to the electrode unit 7 follows this movement so that it moves relative to the parts 3, 4, 5, 6, and 9, and it is merely the tension in the return spring 9 which is increased during this movement. The tension in the return spring 9, which is weak in comparison with the spiral spring 3, is the only force which must be overcome in advancing the electrode unit 7 out of the position of rest into the working position.

Even in the position of the carrier beam nearest to the grid being produced, the electrodes 20 of those electrodes units 7 which are lying in the position of rest close to the carrier beam 1, cannot come into contact with the cross-wires Q of a grid formed from these cross-wires and longitudinal wires L, and which is supported in the welding region on counter-electrodes 22. On the other hand the electrodes 20 lying in the working position remote from the carrier beam 1 come to seat against the cross wires Q, on lowering of the carrier beam 1 (which is movable in the direction of the double arrow P), whereupon with any further lowering of the carrier beam 1 the springs 3 are stressed and apply the necessary welding pressure. The considerable force necessary for stressing the springs 3 is transmitted from each electrode unit 7 via the sleeve 14 onto the wedge 15 and from the latter via the sleeve 13 and the spring plate 5 onto the spiral spring 3. The pivoted connecting links 18 and 19 ensure that the movement of the electrode units 7 and their guide rods 2 against the springs, after the seating of the electrodes 20 against the cross-wires, is not impeded by the wedges 15.

Figure 2:
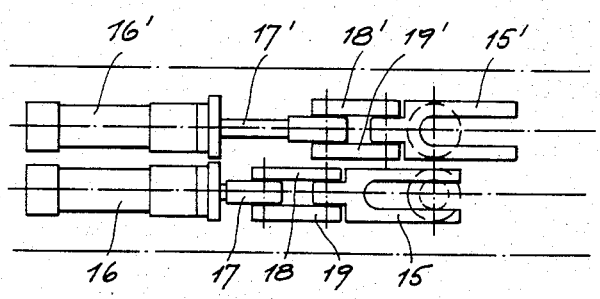
FIG. 2 shows in plan two operating cylinders which in the case of the machine of FIG. 1 serve for the adjustment of adjacent electrode units.
Figure 3:
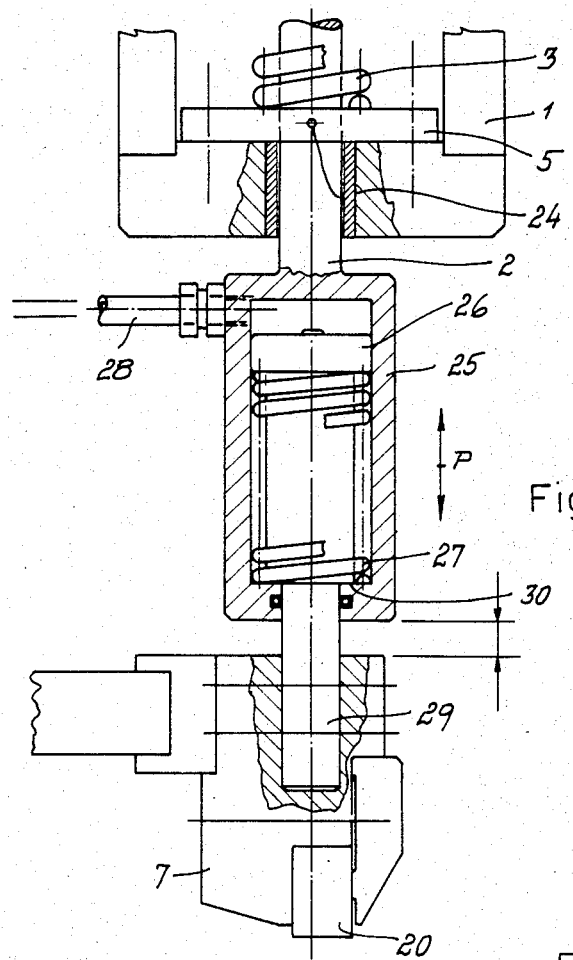
FIG. 3 shows in side elevation the electrode-carrier beam of a second embodiment of the invention.

Whilst in the embodiment of FIGS. 1 and 2 the electrode units 7 together with the guide rods 2 can shift with respect to the spiral springs 3, the spring plates 5 and the carrier beam 1, the second embodiment illustrated in FIG. 3 depends upon an ability of the guide rods 2 to be extended telescopically.

At the bottom end of the guide rod 2, which in this case is connected rigidly to the spring plate 5 by a bolt 24, there is thus provided an operating cylinder 25, in which a piston 26 is slidably guided and is loaded by a return spring 27 in the direction towards its position of rest, close to the carrier beam.

Liquid under pressure may be fed via a pipe 28 to the cylinder 25 or, alternately, the cylinder may be connected to a liquid reservoir, and the pressure in the cylinder be relieved.

The electrode unit 7 is attached to the piston rod 29 of the piston 26. Inside the cylinder 25 this piston rod forms a shoulder 30 to limit the stroke of the piston.

If the piston 26 is acted upon by liquid under pressure and subsequently the feed of pressure medium is blocked, the return spring 27 which again is weak in comparison with the spiral spring 3, becomes compressed and the electrode unit 7 is advanced into the working position remote from the carrier beam 1. The pressure-liquid enclosed in the cylinder head now acts as an incompressible transmission medium through which, upon lowering the carrier beam 1, the pressure from the electrode unit 7 is transmitted to the guide rod 2 and the spring plate 5 rigidly connected to it, so that the spring 3 is stressed.

Figure 4:
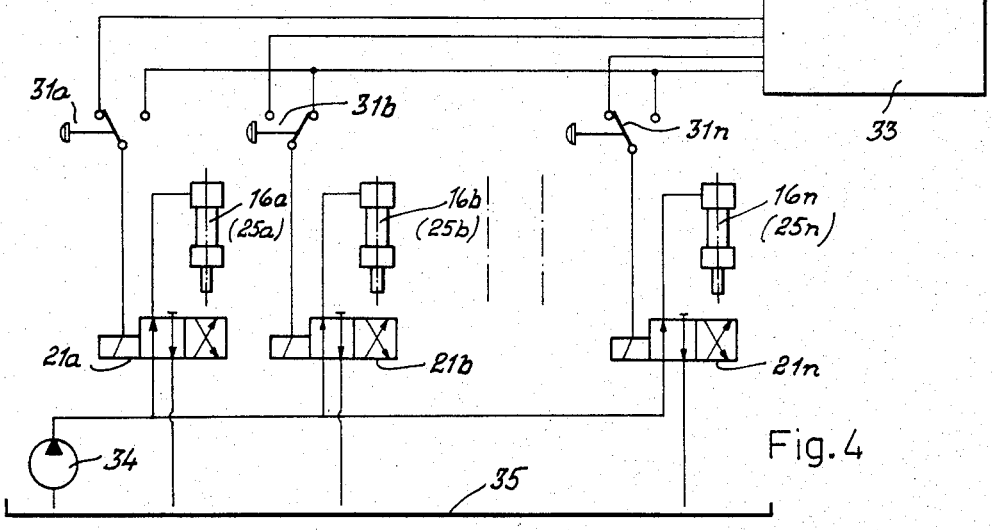
FIG. 4 is a diagram of a hydraulic control device for the embodiments of FIGS. 1 and 3; and, FIGS. 5 and 6 show in elevation similar to FIGS. 3 and 4 the electrode-carrier beam of a third embodiment of the invention and respectively the diagram of a hydraulic control device suitable for it.

In both the above embodiments the action of pressure upon the operating cylinders 16 and 25, respectively, is advantageously controlled for the individual electrode units 7 by electromagnetically actuable valves 21 in accordance with FIG. 4. A suitable control circuit is illustrated in FIG. 4, where the parts of the control circuit belonging, for example, to n different electrode units are distinguished from one another by the indices a, b . . . n. The cylinders 16a, 16b . . . 16n (or 25a, 25b . . . 25n), energized or, respectively, de-energized by associated solenoid valves 21a, 21b . . . 21n either via hand-actuated switches 31a, 31b . . . 31n or via a programming apparatus 33, which can be preset by sets of keys 32a, 32b . . . 32n, may either be supplied with liquid under pressure from a pump 34 or be relieved of pressure by being connected to a liquid reservoir 35.

Figures 5, 6:
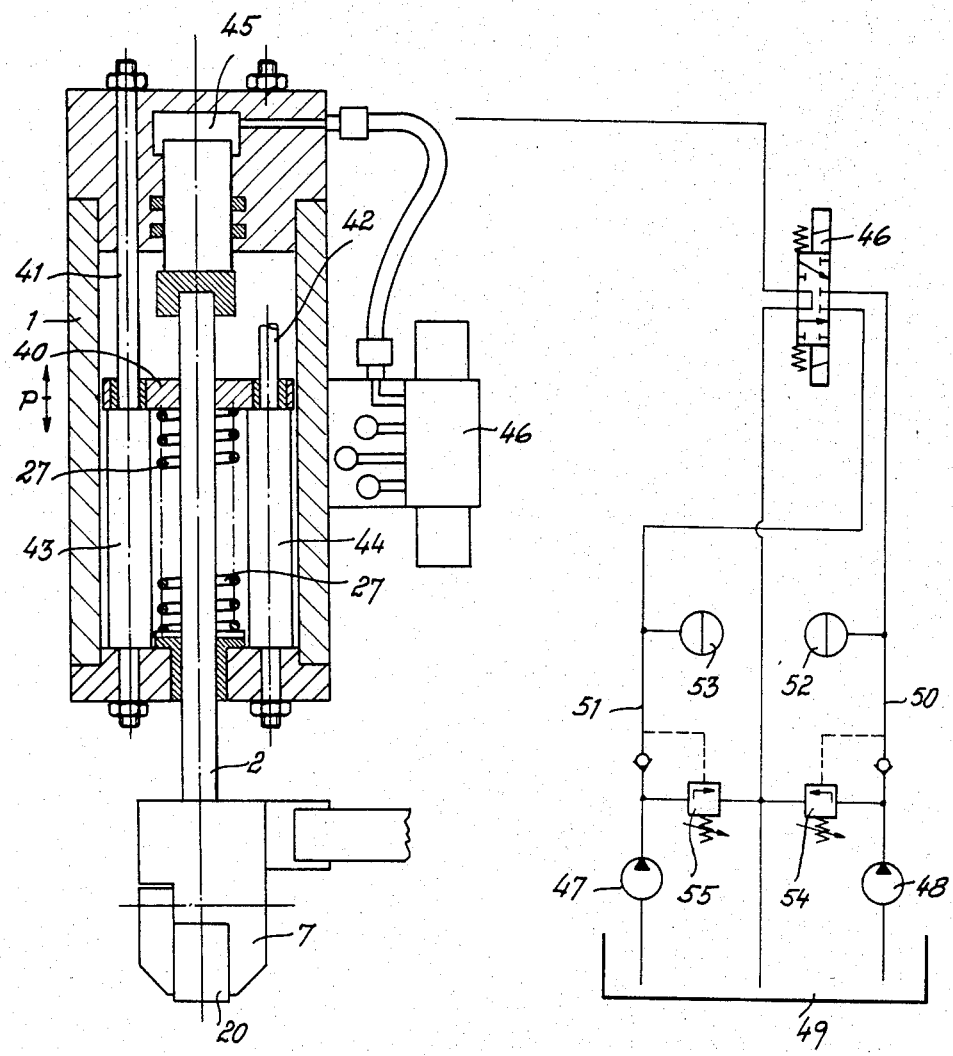

In the embodiment of FIG. 5 a spring plate 40 is connected rigidly to each guide rod 2 and is slidably guided inside the electrode-carrier beam 1 by two guide rods 41 and 42. The lower parts of the guide rods 41, 42 are surrounded by sleeves 43, 44 which form stops limiting the downward movement of the spring plate 40. A return spring 27 loads the spring plate 40 in the upward direction. The guide rod is formed by the piston rod of an operating cylinder 45 which serves as the pressure-spring and which can be acted upon by a pressure medium via an electromagnetically controlled slide valve 46.

For this purpose, as shown in FIG. 6, two pumps 47, 48 are provided, which deliver liquid from a liquid reservoir 49 into leads 50, 51, expansion chambers 52, 53 communicating with these leads 50, 51. The pressures in the two leads are of different values and are kept constant by pressure regulating valves 54, 55.

If the operating cylinder 45 is connected via the slide valve 46 with, for example, the lead 51, the piston in the cylinder 45 is thrust downwards against the action of the return spring 27 until the spring plate 40 comes into contact with the sleeves 43, 44. The electrode unit 7 is then lying in its working position.

If, during the downward movement of the electrode-carrier beam 1, the electrode 20 is seated against the work which is to be welded, the guide rod 2 is thrust upwards against the action of the operating cylinder 45, so that liquid is displaced out of the operating cylinder 45 into the expansion chamber 53. The pressure against the workpiece therefore remains constant during the whole pressing procedure and is equal to the lead pressure multiplied by the cross-section of the piston.

If the slide valve 46 is switched back into the position shown in FIG. 6, the operating cylinder 45 is connected to the reservoir 49 and thereby relieved of pressure, and the return spring 27 brings the electrode unit 7 back into its position of rest.

By pressurizing the two pressure leads 50 and 51 at different respective levels, in this embodiment of the invention, each electrode may be acted upon by one of two optional pressures. In the case of welding machines therefore, by which grids are to be welded, which are built up from longitudinal wires having different respective wires diameters (e.g., edge-economy mats), two different electrode pressures are made available along the weld line.

Two different pressures along the weld line can moreover be achieved in the embodiment of FIG. 3 by having only one supply lead provided with an expansion chamber. That is, if in FIG. 3 the piston 26 is acted upon by liquid under pressure and after the advance of the electrode unit 7 into the working position, the connection to the supply lead is interrupted, e.g., by a solenoid slide valve, then the whole welding pressure is transmitted via the incompressible pressure-liquid enclosed in the cylinder 25, to the spiral spring 3. If, on the other hand, during the welding process the lead 28 is kept by the solenoid slide valve connected with an expansion chamber, the piston 26 can be displaced in the cylinder 25, assuming that the pressure in the lead 28 is so set that the force exerted by the pressure-liquid upon the piston 26 is less than the spring tension of the spiral spring 3. The force pressing the electrode 20 against the workpiece would therefore be less in the second case than in the first.

Instead of hydraulic operating and control circuits, under certain circumstances pneumatic circuits may be used.

We claim:

1. A multispot grid-welding machine defining a grid-welding plane and having an electrode-carrier beam, said beam being movable up and down; a plurality of guide rods; a plurality of electrode units mounted on said guide rods for movement on said beam; and pressure-springs biasing said electrode units in a direction towards said grid-welding plane, each electrode unit being movable into a working position and retractable to a position of rest; a plurality of return springs acting on said electrode units, said return springs being considerably weaker than said pressure-springs and acting with a predetermined force to shift said respective electrode units from said working position into said retracted position of rest nearer said electrode-carrier beam; and means for advancing selected ones of said plurality of said electrode units into said working position by overcoming the force of said return springs, the remaining of said plurality of electrode units being kept in said rest position, wherein each of said electrode units is attached to a front end of a respective guide rod, each guide rod being associated with and surrounded by two sleeves, said sleeves being shiftable relative to the guide rod associated therewith, and relative to one another; and including a spring plate, one of said sleeves bearing against said spring plate of the respective pressure-spring and the other of said sleeves bearing against said electrode unit; and a wedge between said sleeves, said wedge surrounding said guide rod, being adjustable between a first position in which said sleeves are a smaller distance apart, and a position in which said sleeves are a greater distance apart.

2. A grid welding machine according to claim 1, wherein said wedge is fork-shaped.

3. A grid welding machine according to claim 1, further including a piston rod and cylinder for moving said wedge.

4. A grid-welding machine according to claim 3, further comprising means for controlling the action of said operating cylinders, said controlling means including one of solenoid valve and switch means and programming apparatus means for selectively energizing said valve means.

* * * * *